(12) United States Patent
Beser

(10) Patent No.: US 8,473,995 B2
(45) Date of Patent: *Jun. 25, 2013

(54) SYSTEMS AND METHODS FOR INCREASING CABLE MODEM SYSTEM BANDWIDTH EFFICIENCY

(75) Inventor: Nurettin Burcak Beser, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 40 days.

This patent is subject to a terminal disclaimer.

(21) Appl. No.: 13/098,185

(22) Filed: Apr. 29, 2011

(65) Prior Publication Data
US 2011/0206103 A1    Aug. 25, 2011

Related U.S. Application Data

(63) Continuation of application No. 10/659,739, filed on Sep. 11, 2003, now Pat. No. 7,958,534.

(60) Provisional application No. 60/409,982, filed on Sep. 12, 2002.

(51) Int. Cl.
| | | |
|---|---|---|
| H04N 7/173 | (2006.01) | |
| H04B 1/38 | (2006.01) | |
| H04J 1/16 | (2006.01) | |
| H04J 3/16 | (2006.01) | |
| H04J 3/22 | (2006.01) | |
| H04J 3/18 | (2006.01) | |
| H04L 12/28 | (2006.01) | |

(52) U.S. Cl.
USPC ........... 725/111; 375/222; 370/252; 370/431; 370/437; 370/465; 370/468; 370/472; 370/477

(58) Field of Classification Search
USPC .................. 725/111; 375/222; 370/252, 431, 370/437, 465, 468, 472, 477
See application file for complete search history.

(56) References Cited

U.S. PATENT DOCUMENTS

| | | | |
|---|---|---|---|
| 4,912,422 | A | 3/1990 | Kobayashi et al. |
| 5,272,728 | A | 12/1993 | Ogawa |
| 5,903,558 | A | 5/1999 | Jones et al. |
| 6,742,187 | B1 * | 5/2004 | Vogel ............................ 725/126 |
| 6,757,253 | B1 | 6/2004 | Cooper et al. |
| 6,763,032 | B1 | 7/2004 | Rabenko et al. |
| 6,856,786 | B2 | 2/2005 | Belostotsky et al. |

(Continued)

OTHER PUBLICATIONS

Co-pending U.S. Appl. No. 10/659,739, filed Sep. 11, 2003 entitled "Systems and Methods for Increasing Cable Modem System Bandwidth Effciency" by Nurettin Burcak Beser, 32 pages.

(Continued)

Primary Examiner — Hoang-Vu A Nguyen-Ba
(74) Attorney, Agent, or Firm — Harrity & Harrity, LLP

(57) ABSTRACT

A cable modem termination system measures signal qualities of upstream transmissions associated with one or more cable modems. The system monitors the measured upstream signal qualities, and selectively commands at least one of the one or more cable modems to switch between upstream channels based on the signal quality monitoring.

20 Claims, 7 Drawing Sheets

U.S. PATENT DOCUMENTS

| | | | |
|---|---|---|---|
| 6,891,858 B1 | 5/2005 | Mahesh et al. | |
| 6,898,755 B1 | 5/2005 | Hou | |
| 7,017,176 B1 | 3/2006 | Lee et al. | |
| 7,039,939 B1 | 5/2006 | Millet et al. | |
| 7,113,484 B1 * | 9/2006 | Chapman et al. | 370/252 |
| 2001/0055319 A1 | 12/2001 | Quigley et al. | |
| 2002/0114379 A1 | 8/2002 | Uesugi et al. | |
| 2003/0137966 A1 | 7/2003 | Odman et al. | |

OTHER PUBLICATIONS

Sunkad, "Quality-of-Service: a DOCSIS/PacketCable Perspective," Part 1, Apr. 2000, SPECS News & Technology from CableLabs, vol. 12, No. 3.

Data-Over-Cable Service Interface Specifications, Radio Frequency Interface Specification, SP-RFIv1.1-I05-000714, Interim Specification, 1999, 2000 Cable Television Laboratories, Inc., 424 pages.

* cited by examiner

SYSTEMS AND METHODS FOR INCREASING CABLE MODEM SYSTEM BANDWIDTH EFFICIENCY

CROSS REFERENCE TO RELATED APPLICATIONS

The instant application is a continuation of U.S. patent application Ser. No. 10/659,739, filed Sep. 11, 2003, which claims priority from U.S. Provisional Application No. 60/409,982, filed Sep. 12, 2002, the disclosures of which are incorporated by reference herein in their entirety.

BACKGROUND OF THE INVENTION

1. Field of the Invention

The present invention relates generally to cable modem systems and, more particularly, to systems and methods for improving bandwidth efficiency in cable modem systems.

2. Description of Related Art

In conventional cable modem systems, a cable modem termination system (CMTS) at the headend typically services multiple cable modems (CMs). The CMTS transmits data and messages to the CMs on a downstream frequency and receives data bursts from the CMs on different upstream frequencies. Conventionally, CMTSs' upstream receivers are set to receive upstream signals from the CMs based on the capabilities of the lowest performing CM. Thus, even though some CMs may have higher performance capabilities, all CMs will be set to transmit at the settings of the least capable CM. With all CMs set to transmit at the settings of the least capable CM, the available upstream bandwidth is used inefficiently. The CMs with higher performance capabilities will use more bandwidth than if they transmitted using their higher performance capabilities. Conventional cable modem systems, thus, inefficiently use available upstream bandwidth.

Therefore, there is a need in the art to more efficiently use upstream bandwidth in cable modem systems.

SUMMARY OF THE INVENTION

Systems and methods consistent with the principles of the invention address this and other needs by altering transmission characteristics of modems of a cable modem system to improve bandwidth utilization. Systems and methods consistent with the principles of the invention may monitor upstream transmission quality and command cable modems to alter their transmission characteristics to improve transmission rate and, thus, increase bandwidth utilization. For example, altering the modulation scheme a modem uses (e.g., QPSK to 16QAM) may substantially improve the modem's transmission rate. By "moving" one or more modems from under performing transmission settings to better performing transmission settings, available bandwidth of the cable modem system may be used more efficiently.

In accordance with one aspect of the invention as embodied and broadly described herein, a method of altering modem transmission characteristics includes setting a modem to transmit on a first upstream channel using first transmission characteristics. The method further includes monitoring a quality of the modem upstream transmissions on the first upstream channel. The method also includes setting the modem to transmit on a second upstream virtual channel using second transmission characteristics based on the monitored quality.

In another implementation consistent with principles of the invention, a method of controlling transmission characteristics of cable modems includes monitoring upstream transmission quality of one or more cable modems. The method further includes commanding at least one of the one or more cable modems to change its transmission characteristics based on the monitored quality.

In still another implementation consistent with principles of the invention, a method of changing virtual upstream channels in a cable modem system includes monitoring upstream signal qualities associated with one or more cable modems. The method further includes selectively switching at least one of the one or more cable modems between virtual upstream channels based on the signal quality monitoring.

BRIEF DESCRIPTION OF THE DRAWINGS

The accompanying drawings, which are incorporated in and constitute a part of this specification, illustrate embodiments of the invention and, together with the description, explain the invention. In the drawings.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents.

Systems and methods consistent with the principles of the invention implement mechanisms for moving cable modems in a cable modem system from under performing transmission settings to better performing transmission settings to improve upstream bandwidth utilization. Different cable modems of the system may, thus, transmit using different transmission characteristics, such as, for example, a different modulation or symbol rate. A CMTS, consistent with the principles of the invention, may monitor transmission quality from each of the modems of the cable modem system to ensure that the transmissions from each cable modem maintain a sufficient level of quality. If transmissions from any one cable modem does not meet an expected level of quality, or sufficiently exceeds the expected level of quality, the CMTS may command the cable modem to change its transmission characteristics to either improve the transmission quality or improve the cable modem's performance (e.g., transmission rate), respectively.

Exemplary Network

Figure 1:
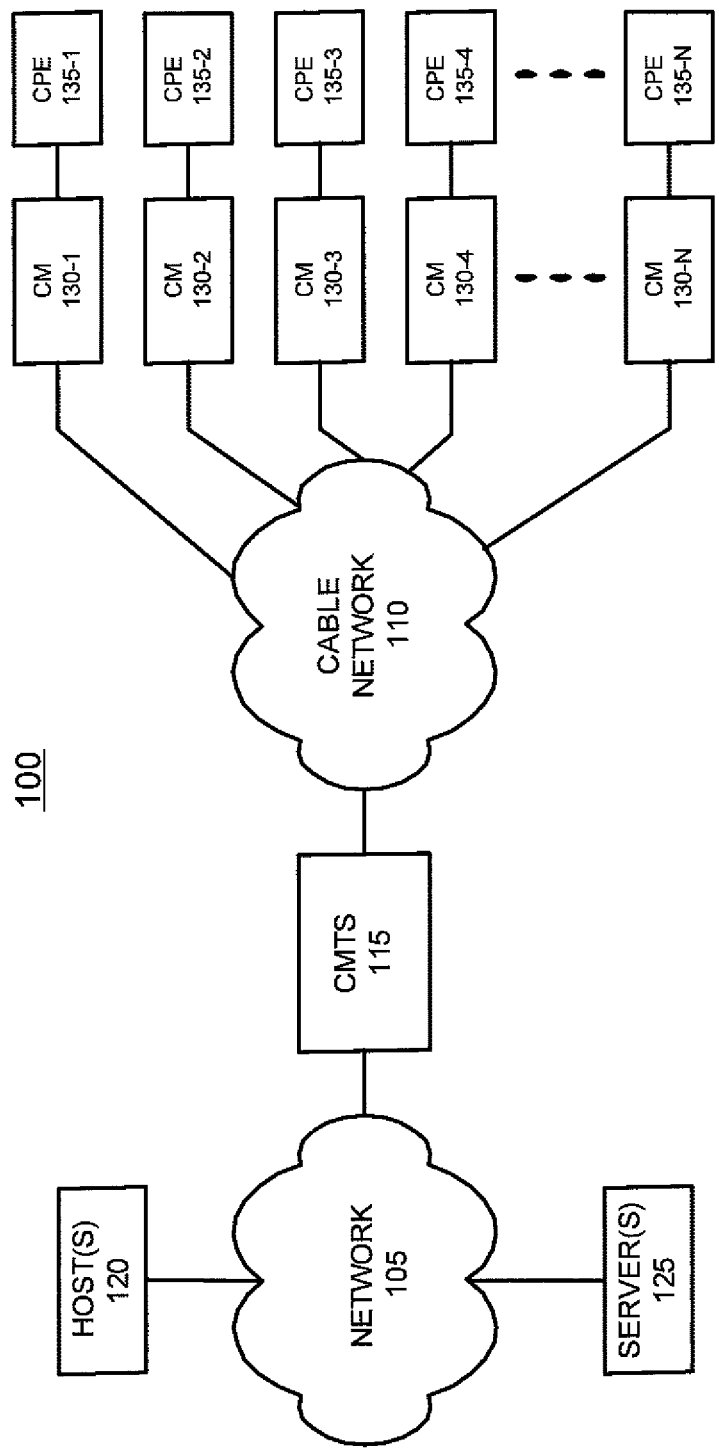
FIG. 1 is a diagram of an exemplary network in which systems and methods consistent with the principles of invention may be implemented.

FIG. 1 is a diagram of an exemplary network 100 in which systems and methods consistent with the principles of the invention may be implemented. Network 100 may include sub-network 105 and cable sub-network 110 interconnected via a CMTS 115. Host(s) 120 and server(s) 125 may connect with sub-network 105 via any type of link, such as, for example, wired, wireless or optical connection links. Sub-network 105 can include one or more networks of any type, including a Public Land Mobile Network (PLMN), Public Switched Telephone Network (PSTN), local area network (LAN), metropolitan area network (MAN), wide area network (WAN), Internet, or Intranet. The one or more networks may alternatively include packet-switched sub-networks, such as, for example, General Packet Radio Service (GPRS), Cellular Digital Packet Data (CDPD), and Mobile IP sub-networks.

Cable sub-network 110 may include a coaxial or hybrid optical fiber/coaxial (HFC) cable network. Cable modems 130-1 through 130-N may interconnect with cable sub-network 110 via coaxial cable/optical fiber. Each cable modem 130 couples with a respective Customer Premises Equipment (CPE) 135. Each CPE 135 may include a television, a computer, a telephone, or any other type of equipment that can receive and/or send data via cable network 110.

CMTS 115 may transmit data received from host(s) 120 or server(s) 125 on one or more downstream channels via cable network 110 to cable modems 130. Cable modems 130 may receive the downstream transmissions and pass the demodulated transmissions on to respective CPEs 135. Cable modems 130 may further receive data from respective CPEs 135, modulate the data, and transmit the data on one or more upstream channels to CMTS 115 via cable network 110. CMTS 115 may forward the data, via network 105, to host(s) 120 or server(s) 125.

It will be appreciated that the number of components illustrated in FIG. 1 is provided for explanatory purposes only. A typical network may include more or fewer components than are illustrated in FIG. 1.

Exemplary Cable Modem Termination System

Figure 2:
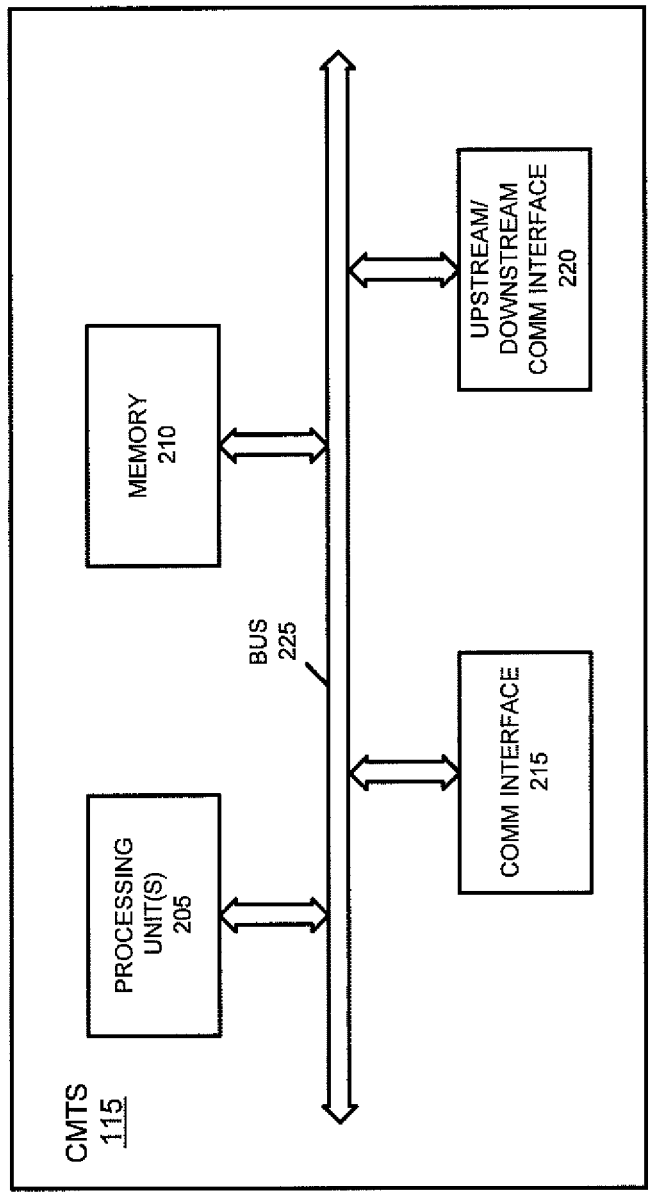
FIG. 2 is a diagram of an exemplary cable modem termination system (CMTS) according to an implementation consistent with the principles of invention.

FIG. 2 illustrates a diagram of an exemplary CMTS 115 according to an implementation consistent with the principles of the invention. CMTS 115 may include one or more processing units 205, a memory 210, a communication interface 215, an upstream/downstream communication interface 220, and a bus 225.

Processing unit 205 may perform data processing functions for data transmitted/received via communication interface 215 to/from sub-network 105, and data transmitted/received via upstream/downstream communication interface 220 to/from cable network 110. Memory 210 may include Random Access Memory (RAM) that provides temporary working storage of data and instructions for use by processing unit 205 in performing control and processing functions. Memory 210 may additionally include Read Only Memory (ROM) that provides permanent or semi-permanent storage of data and instructions for use by processing unit 205.

Memory 210 can also include large-capacity storage devices, such as a magnetic and/or optical recording medium and its corresponding drive.

Communication interface 215 may include conventional circuitry well known to one skilled in the art for transmitting data to, or receiving data from, sub-network 105. Upstream/downstream communication interface 220 may include transceiver circuitry well known to one skilled in the art for transmitting data bursts on downstream channels, and receiving data bursts on upstream channels, via cable sub-network 110. Such transceiver circuitry may include amplifiers, filters, modulators/demodulators, interleavers, error correction circuitry, and other conventional circuitry used to convert data into radio frequency (RF) signals for transmission via cable network 110, or to interpret data bursts received from cable modems 130 via cable network 110 as data symbols.

Bus 225 interconnects the various components of CMTS 115 to permit the components to communicate with one another.

Exemplary Cable Modem

Figure 3:
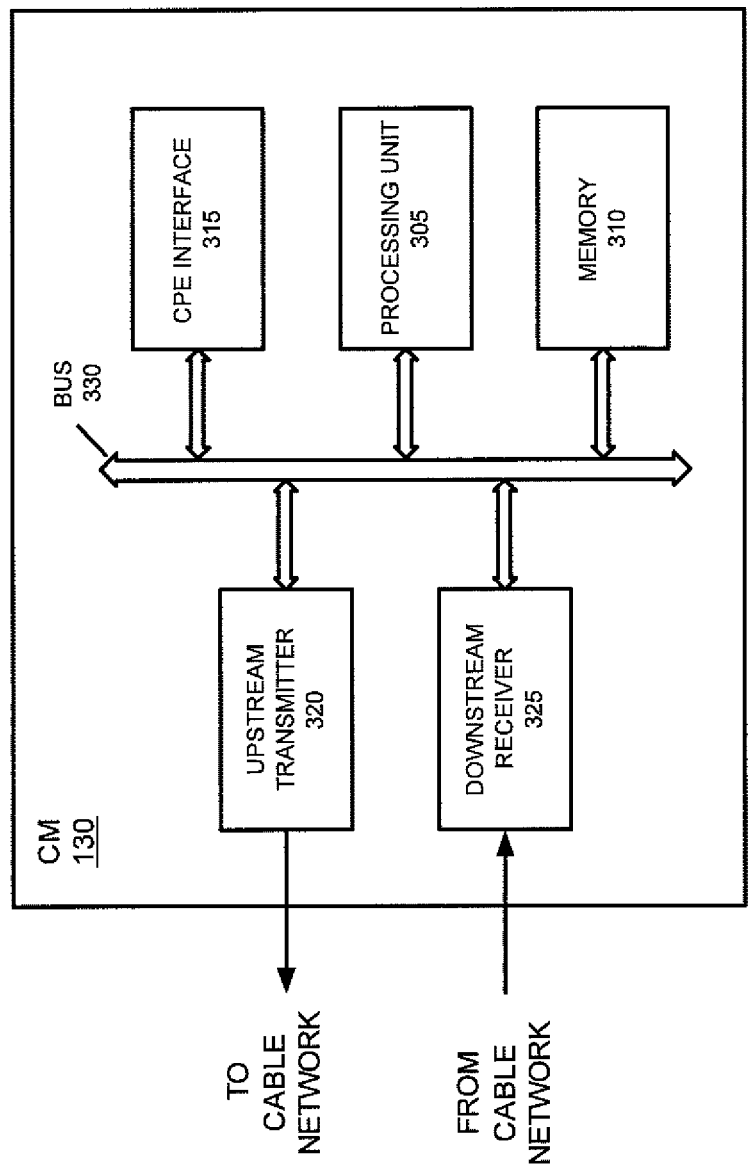
FIG. 3 is a diagram of an exemplary cable modem (CM) according to an implementation consistent with the principles of invention.

FIG. 3 illustrates a diagram of an exemplary CM 130 according to an implementation consistent with the principles of the invention. CM 130 may include a processing unit 305, a memory 310, a CPE interface 315, an upstream transmitter 320, a downstream receiver 325, and a bus 330.

Processing unit 305 may perform data processing functions for data received via downstream receiver 325 and data transmitted via upstream transmitter 320. Memory 310 may include RAM that provides temporary working storage of data and instructions for use by processing unit 305 in performing control and processing functions. Memory 310 may additionally include ROM that provides permanent or semi-permanent storage of data and instructions for use by processing unit 305. Memory 310 can also include large-capacity storage devices, such as a magnetic and/or optical recording medium and its corresponding drive.

CPE interface 315 may include circuitry well known to one skilled in the art for interfacing with a CPE 135. Upstream transmitter 320 may include circuitry well known in the art for transmitting on an upstream channel. For example, upstream transmitter 320 may include amplifiers, filters, modulators, interleavers, error correction circuitry, and other conventional circuitry used to convert data into RF signals for transmission via cable sub-network 110. Downstream receiver 325 may include circuitry well known to one skilled in the art for receiving data bursts on a downstream channel. For example, downstream receiver 325 may include amplifiers, filters, demodulators and other conventional circuitry used to interpret data bursts received from CMTS 115 as data symbols.

Bus 330 interconnects the various components of CM 130 to permit the components to communicate with one another.

Exemplary Downstream/Upstream Communication

Figure 4:
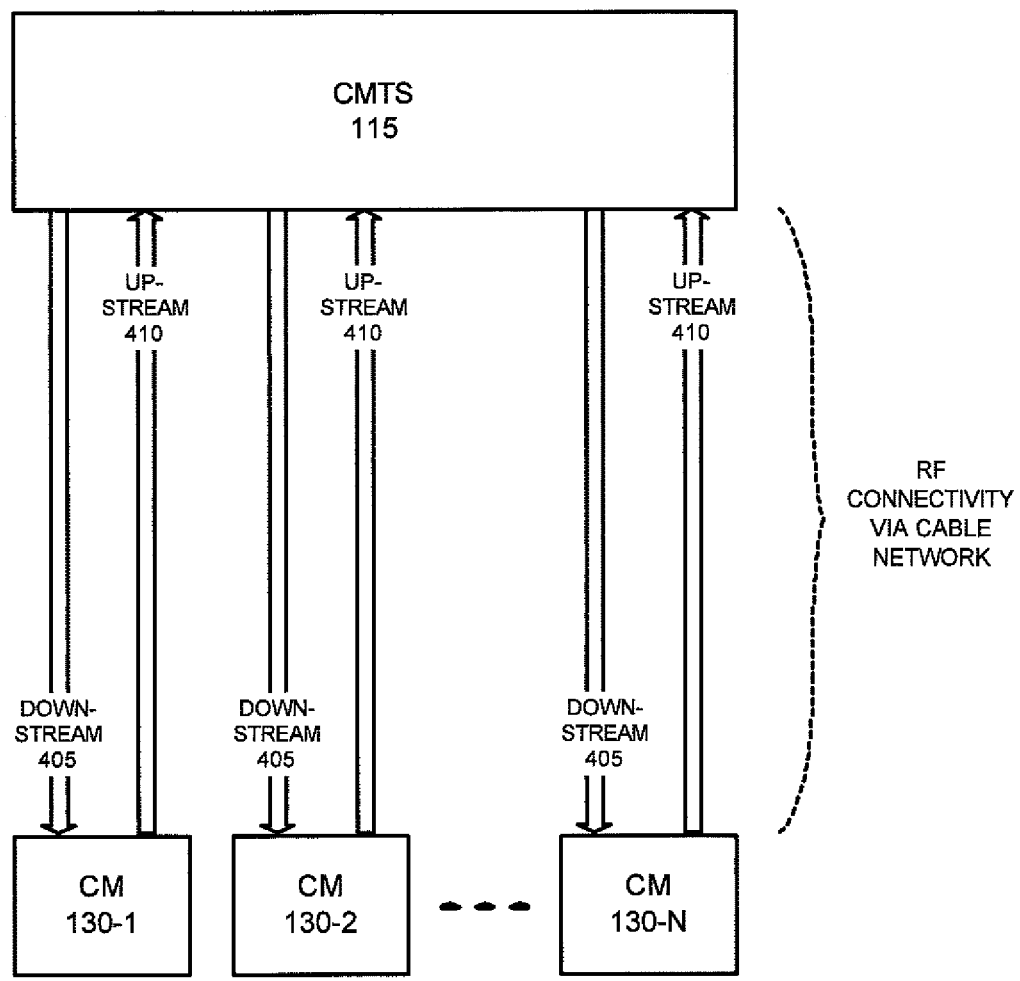
FIG. 4 is a diagram of exemplary upstream/downstream communications between a CMTS and multiple cable modems according to an implementation consistent with the principles of invention.

FIG. 4 illustrates exemplary upstream and downstream communication between a CMTS 115 and multiple CMs 130 according to an implementation consistent with the principles of the invention. As illustrated in FIG. 4, CMTS 115 and CMs 130-1 through 130-N interconnect via downstream RF channels 405 and upstream RF channels 410 of cable network 110. Each downstream channel 405 and upstream channel 410 may include a different frequency. CMTS 115 may transmit messages and data to each CM 130 on a downstream channel 405 and may receive transmission from each CM 130 via an upstream channel 410. Each upstream channel 410 may include multiple "virtual" channels. Each virtual upstream channel may include a time division multiplexed (TDM) timeslot of the upstream channel frequency. Each virtual upstream channel may further be associated with different transmission characteristics of cable modems 130. Such different transmission characteristics may include a different channel profile, such as different TDM timeslot size, symbol rate, frequency, pre-amble pattern, and/or burst profile. The different burst profile may include a different modulation, pre-amble length, data block size (e.g., Reed-Solomon block size), error correction (e.g., Reed-Solomon error correction), scrambling or encryption, encoding (e.g., differential encoding), maximum burst size, and/or guard time size.

Upstream channels 410 from cable modems 130-1 through 130-N may, thus, include frequency bandwidth divided into multiple channels, with each channel possibly further time division multiplexed into multiple virtual upstream channels. CMTS 115 may monitor a quality of the transmissions from each CM 130 on upstream channels 410. Based on this monitoring, CMTS 115 may command one or more CMs 130 to change their transmission characteristics, such as changing their channel and/or burst profile. For example, CMTS 115 may command CM 130-1 to increase its performance (i.e., bit rate) by changing from quadrature phase shift keying (QPSK) modulation to 16 quadrature amplitude modulation (16QAM) (or to 8QAM, 32QAM or 64QAM). Such a change may increase CM 130-1's transmission rate from, for example, approximately 2 Mbps to approximately 10 Mbps. In other implementations, for example, CMTS 115 may command CM 130-1 to change from 8QAM to 32 QAM, from 16QAM to 64QAM, etc. to increase CM 130-1's performance. As another example, CMTS 115 may command CM 130-N to increase its symbol rate. Thus, if CM 130-N is using QPSK and transmitting at approximately 2 Mbps, increasing the symbol rate may increase the bit rate.

CMTS 115 may issue commands to CMs 130 to instruct them to select one of multiple upstream channel descriptors (UCDs). The multiple UCDs each may describe different upstream transmission characteristics that are to be used by CMs 130 for transmitting on an upstream channel 410.

Exemplary Upstream Channel Descriptor

Figure 5:
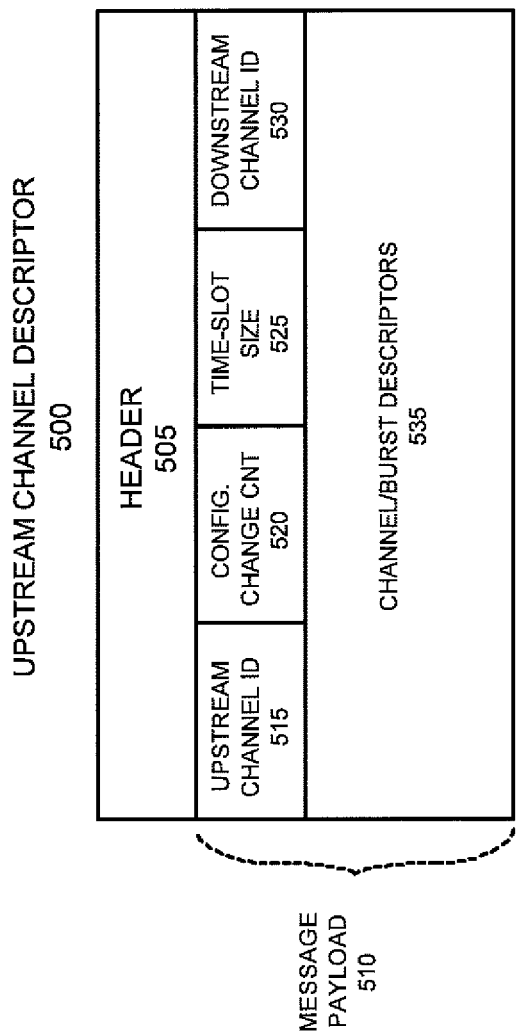
FIG. 5 is a diagram of an exemplary upstream channel descriptor according to an implementation consistent with the principles of the invention.

FIG. 5 illustrates an exemplary upstream channel descriptor (UCD) 500, one or more of which may be periodically transmitted from CMTS 115 to CMs 130, according to an implementation consistent with the principles of the invention. UCD 500 may include a header 505 and a message payload 510. Header 505 may include conventional overhead data for the use of any type of medium access control protocol.

Message payload 510 may include an upstream channel identifier 515, a configuration change count 520, a time-slot size 525, a downstream channel identifier 520 and channel/burst descriptors 535. Upstream channel identifier 515 may identify the upstream channel that is associated with this UCD 500. Configuration change count 520 may indicate when any values of this UCD 500 change. If the value of count 520 remains the same, a receiving CM 130 can conclude that the fields of UCD 500 have not changed, and may disregard the remainder of the message. Time-slot size 525 may indicate the size T of the time-slot for the upstream channel identified by upstream channel identifier 515. T may include integer multiples of 2 (e.g., T=2M).

Downstream channel identifier 530 may indicate the downstream channel on which UCD 500 has been transmitted. Burst/channel descriptors 535 may indicate channel and burst profiles for CM transmission on the channel identified by upstream channel identifier 515. The channel profile may include symbol rate, frequency and pre-amble pattern. The burst profile may include modulation (e.g., QPSK, 16AM, 8QAM, 32QAM, 64QAM), pre-amble length, data block size, error correction, scrambling or encryption, encoding, maximum burst size, and guard time size.

Exemplary CM Transmission Quality Monitoring Process

Figure 6:
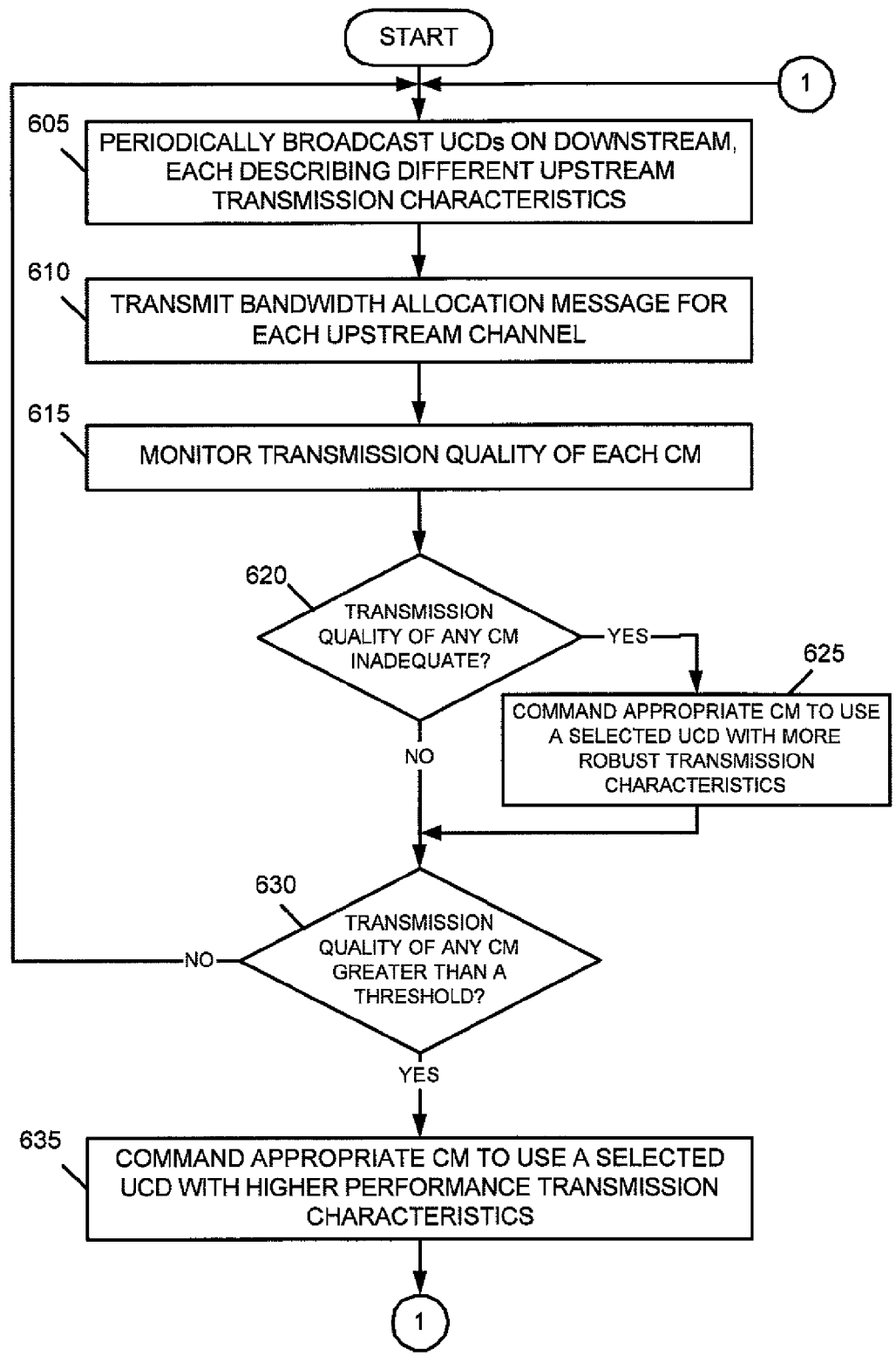
FIG. 6 is a flow chart illustrating an exemplary CMTS upstream transmission quality monitoring process according to an implementation consistent with the principles of the invention.

FIG. 6 illustrates an exemplary process for monitoring CM transmission quality in a manner consistent with the principles of the invention. As one skilled in the art will appreciate, the method exemplified by FIG. 6 can be implemented as a sequence of instructions and stored in memory 210 of CMTS 115 for execution by processing unit(s) 205.

The exemplary process may begin with CMTS 115 periodically broadcasting multiple UCDs on one or more downstream channels 405, with each of the multiple UCDs describing different upstream transmission characteristics [act 605]. For example, each UCD 500 may include a different upstream channel identifier 515. Each UCD may further include different channel/burst descriptors 535. CMTS 115 may also transmit a bandwidth allocation message for each upstream channel 410 [act 610]. Each bandwidth allocation message may define transmission opportunities on an associated upstream channel 410, such as, for example, available time slots over which a CM 130 may transmit.

CMTS 115 may then monitor the transmission quality of each upstream transmission from a corresponding CM 130 [act 615]. CMTS 115 may monitor quality parameters, such as, for example, bit-error-rate or signal-to-noise ratio, using well-known circuitry within upstream/downstream communication interface 220.

CMTS 115 may determine whether the upstream transmission quality of any CM 130 is inadequate [act 620]. Transmission quality measurements for each upstream channel may be compared with a single upstream quality parameter to determine whether the measured transmission quality does not meet the quality requirements. Alternatively, transmission quality measurements for each upstream channel may be compared with different upstream quality parameters associated with each channel. If the upstream quality of any CM(s) 130 is inadequate, CM(s) 130 with the inadequate upstream transmission quality may be commanded to use a selected UCD that include more robust transmission characteristics [act 625]. For example, one UCD may include a burst profile with modulation set to QPSK, whereas another UCD may include a channel profile with modulation set to 16QAM, 8QAM, 32QAM or 64QAM. CMTS 115 may command CM 130 to select a specific UCD that includes a description of more robust QPSK modulation.

If the upstream transmission quality of any CM 130 is sufficiently adequate, CMTS 115 may further determine whether the upstream transmission quality of a CM 130 is greater than a pre-selected quality threshold [act 630]. If not, the exemplary process may return to act 605 above. If the upstream transmission quality of any CM 130 is greater than the quality threshold, then the appropriate CM(s) 130 may be commanded to use a selected UCD with higher performance transmission characteristics [act 635]. For example, if a monitored CM 130 has a bit error rate less than a pre-selected maximum bit error rate, than CMTS 115 may command that CM 130 to use a UCD that includes channel/burst descriptors 535 that specify, for example, 16QAM modulation instead of the CM 130's current QPSK modulation. The exemplary process of acts 605-635 may be selectively repeated to, for example, maximize the performance of any CM 130 (e.g., maximize bit rate) while maintaining adequate upstream signal quality.

Exemplary CM Transmission Characteristic Alteration Process

Figure 7:
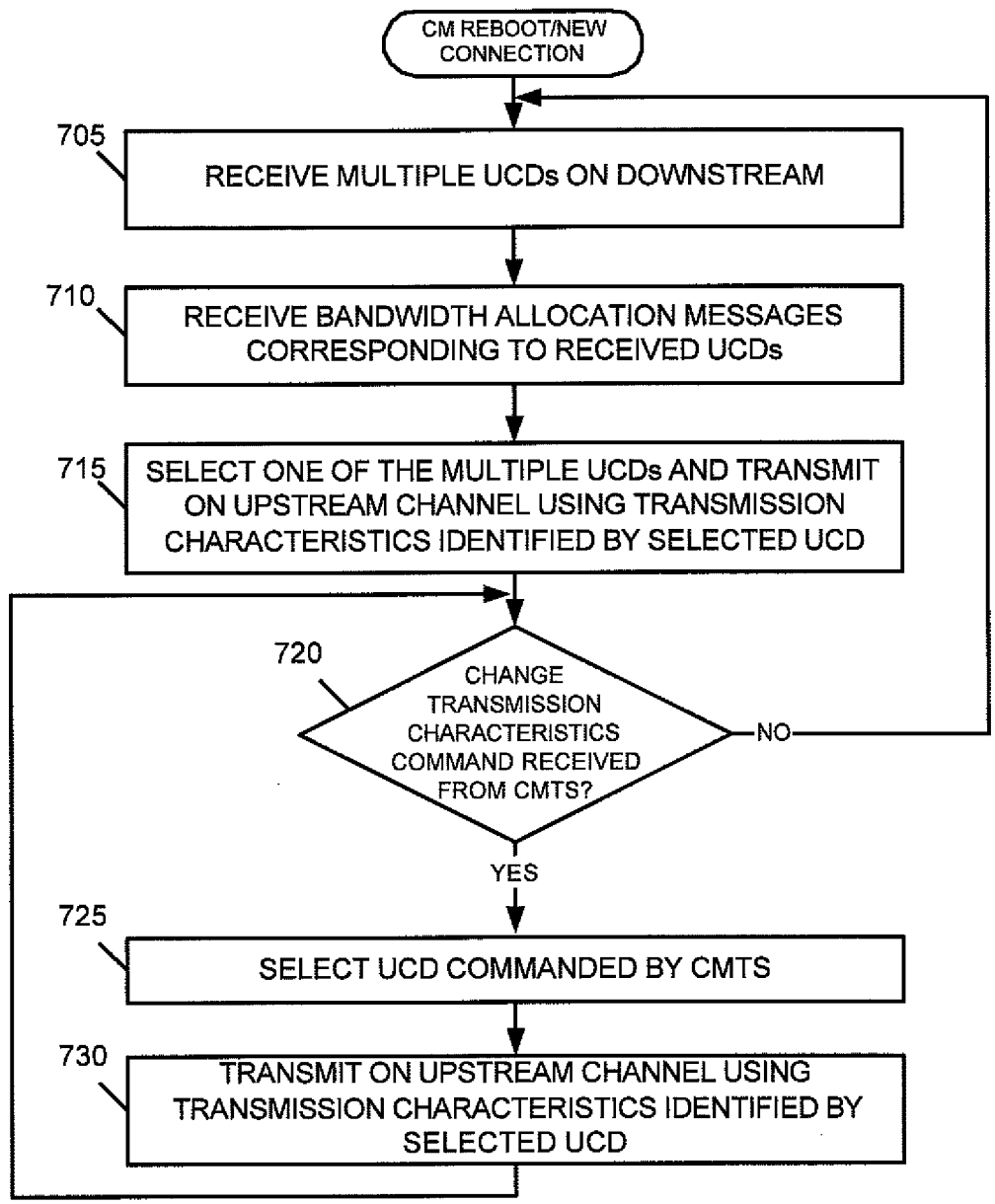
FIG. 7 is a flowchart illustrating an exemplary CM transmission characteristic parameter alteration process according to an implementation consistent with the principles of the invention.

FIG. 7 illustrates an exemplary cable modem transmission characteristic alteration process according to an implementation consistent with the principles of the invention. As one skilled in the art will appreciate, the process exemplified by FIG. 7 can be implemented as a sequence of instructions and stored in memory 310 of CM 130 for execution by processing unit 305.

The exemplary process may begin with a CM 130 either being newly connected to cable sub-network 110, or being re-booted. CM 130 may periodically receive multiple UCDs 500 on a downstream channel 405 [act 705]. Each UCD 500 may specify different transmission characteristics for CM 130, such as, for example, different channel/burst descriptors 535. Each UCD 500 may further specify a different upstream virtual channel via upstream channel identifier 515. CM 130 may also receive bandwidth allocation messages corresponding to each of the received UCDs [act 710]. One of the UCDs may be selected and CM 130 may then transmit on an upstream channel 410 using transmission characteristics identified by the selected UCD [act 715]. CM 130 may select one of the multiple UCDs randomly or according to any other criteria.

A determination may be made whether a "change transmission characteristics" command has been received from CMTS 115 on a downstream channel 405 [act 720]. If not, the exemplary process may return to act 705 above. If a change transmission characteristics command has been received, then CM 130 may select a UCD 500, as commanded by CMTS 115, from the multiple received UCDs [act 725]. The multiple UCDs 500 may be received periodically from CMTS 115 and, thus, CM 130 may select a UCD commanded by CMTS 115 from the most recently received UCDs 500.

CM 130 may transmit on an upstream channel 410 using transmission characteristics identified by the selected UCD [act 730]. The selected UCD may include a different channel and/or burst profile in channel/burst descriptors 535. The different channel and/or burst profile may specify, for example, a different modulation scheme or a different symbol rate that increases the transmission rate of CM 130. For example, the selected UCD may change CM 130 from QPSK to 16QAM modulation, thus, increasing the transmission rate from, for example, approximately 2 Mbps to approximately 10 Mbps. The exemplary process of FIG. 7 may be selectively repeated by CMs 130-1 through 130-N so that as many CMs 130 as possible can move to better performing (i.e., higher transmission rate) transmission characteristics. Bandwidth utilization, thus, may be improved using the exemplary processes of FIGS. 6-7 consistent with the principles of the invention.

CONCLUSION

Consistent with the principles of the present invention, processes may be implemented that selectively alter the transmission characteristics of one or more modems of a cable modem system to improve bandwidth utilization. Systems and methods consistent with the principles of the invention may monitor upstream transmission quality and command cable modems to alter their transmission characteristics to improve transmission rate and, thus, increase bandwidth utilization. For example, altering the modulation scheme a modem uses (e.g., QPSK to 16QAM, QPSK to 32QAM, etc.) may substantially improve the modem's bit rate. By "moving" one or more modems from under performing transmission settings to better performing transmission settings, available bandwidth of the cable modem system may be utilized more efficiently.

The foregoing description of embodiments of the present invention provides illustration and description, but is not intended to be exhaustive or to limit the invention to the precise form disclosed. Modifications and variations are possible in light of the above teachings or may be acquired from practice of the invention. For example, certain portions of the invention have been described as executed as instructions by one or more processing units. However, implementations, other then software implementations, may be used with the present invention, including, for example, hardware implementations such as application specific integrated circuits, field programmable gate arrays, or combinations of hardware and software. Furthermore, instead of, or in addition to, channels being time division multiplexed into multiple virtual upstream channels, channels that include portions of a frequency bandwidth may be code division multiplexed (e.g., CDMA) into multiple virtual upstream channels. While series of acts has been described in FIGS. 6 and 7, the order of the acts may vary in other implementations consistent with the present invention. Also, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed:

1. A method comprising:
   setting a modem to transmit on a first upstream channel on a first frequency using first transmission characteristics;
   monitoring a quality of upstream transmissions from the modem on the first upstream channel; and
   setting the modem to transmit on a second different upstream channel on a second different frequency using second transmission characteristics based on the monitored quality.

2. The method of claim 1, where setting the modem to transmit on a second different upstream channel further comprises:
   determining whether the quality of the modem upstream transmissions is inadequate; and
   setting the second transmission characteristics to more robust transmission characteristics based on the determination.

3. The method of claim 2, where the first transmission characteristics comprise at least one of 16 quadrature amplitude modulation (16QAM), 8QAM, 32QAM, or 64QAM, and the second transmission characteristics comprise quadrature phase shift keying (QPSK) modulation.

4. The method of claim 1, where setting the modem to transmit on a second different upstream channel further comprises:
   determining whether the quality of the modem upstream transmissions is greater than a threshold; and setting the second transmission characteristics to better performing transmission characteristics based on the determination.

5. The method of claim 4, where the first transmission characteristics comprise quadrature phase shift keying (QPSK) modulation and the second transmission characteristics comprise at least one of 16 quadrature amplitude modulation (16QAM), 8QAM, 32QAM, or 64QAM.

6. The method of claim 1, where the first upstream channel comprises a first time division of the first frequency.

7. The method of claim 6, where the second different upstream channel comprises a second time division of the second different frequency.

8. The method of claim 1, where the quality comprises at least one of bit-error-rate or signal-to-noise ratio.

9. A cable modem termination system, comprising:
a communication interface to:
receive transmissions comprising first transmission characteristics from a modem on a first upstream channel on a first frequency, and
measure a quality of the received upstream transmissions from the modem; and
a processor to:
monitor the measured quality of the received transmissions, and
send a message, via the communication interface, instructing the modem to transmit on a second different upstream channel on a second different frequency using second transmission characteristics based on the monitored quality.

10. The system of claim 9, the processor further to:
determine whether the quality of the modem upstream transmissions is inadequate; and
set the second transmission characteristics to more robust transmission characteristics based on the determination.

11. The system of claim 10, where the first transmission characteristics comprise at least one of 16 quadrature amplitude modulation (16QAM), 8QAM, 32QAM, or 64QAM, and the second transmission characteristics comprise quadrature phase shift keying (QPSK) modulation.

12. The system of claim 9, the processor further to:
determine whether the quality of the modem upstream transmissions is greater than a threshold; and
set the second transmission characteristics to better performing transmission characteristics based on the determination.

13. The system of claim 12, where the first transmission characteristics comprise quadrature phase shift keying (QPSK) modulation and the second transmission characteristics comprise at least one of 16 quadrature amplitude modulation (16QAM), 8QAM, 32QAM, or 64QAM.

14. The system of claim 9, where the first upstream channel comprises a first time division of the first frequency.

15. The system of claim 14, where the second different upstream channel comprises a second time division of the second different frequency.

16. The system of claim 9, where the quality comprises at least one of bit-error-rate or signal-to-noise ratio.

17. A method comprising:
transmitting, by a modem, on a first upstream channel on a first frequency;
receiving, by the modem, a command to select different upstream transmission characteristics;
selecting, by the modem, the different upstream transmission characteristics in accordance with the command; and
transmitting, by the modem and based on the selecting, on a second different upstream channel on a second different frequency using the different upstream transmission characteristics.

18. The method of claim 17, further comprising:
receiving a plurality of messages, each message describing different transmission characteristics.

19. The method of claim 18, where the command indicates use of one of the plurality of messages for selecting different upstream transmission characteristics.

20. The method of claim 18, where the first upstream channel comprises a first time division of the first frequency and the second different upstream channel comprises a second time division of the second different frequency.

* * * * *